3,211,736
N-[(1-PIPERIDYL)-LOWER-ALKYL]-(3-, 2-, AND
1-INDOLYL)-LOWER-ALKANOYLAMIDES
Bernard L. Zenitz, Colonie, and Donald Craig Behn,
Schodack, N.Y., assignors to Sterling Drug Inc., New
York, N.Y., a corporation of Delaware
No Drawing. Filed May 8, 1962, Ser. No. 193,310
15 Claims. (Cl. 260—270)

This invention relates to new N-[(1-piperidyl)-lower-alkyl]-(3-, 2-, and 1-indolyl)-lower - alkanoylamides, N-[(1-piperidyl)-lower-alkyl]-3-, 2-, and 1-indolyl)-lower-alkyl]amines, their acid-addition and quaternary ammonium salts, and to processes for the preparation thereof.

The present invention resides in the concept of attaching to the amino nitrogen atom of an N-[(1-piperidyl)-lower-alkyl]amine or an N,N-bis-[(1-piperidyl)-lower-alkyl]amine a (1-, 2-, or 3-indolyl)-lower-alkanoyl group or a (1-, 2-, or 3-indolyl)-lower-alkyl group.

The compounds of the invention have the formulas

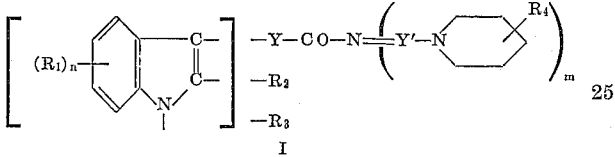

and

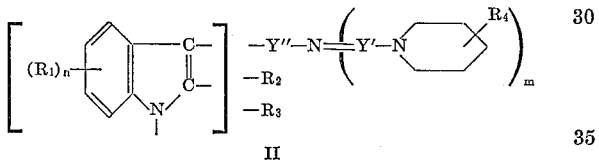

where any of the three free valences at the 1-, 2-, or 3-positions of the indole ring in compounds of Formulas I and II can be taken up by the

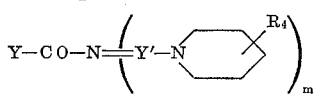

and

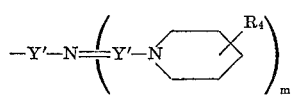

groups, respectively, and the valences at the 1- and 2-positions of the indole nucleus when not taken up by the above groups are taken up, respectively, by the groups $R_2$ and $R_3$.

The compounds of the invention thus can also be represented by the formulas

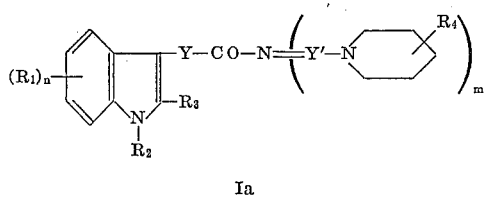

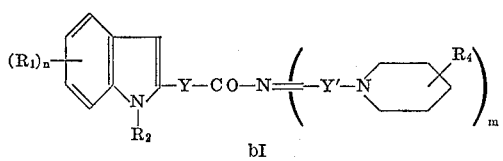

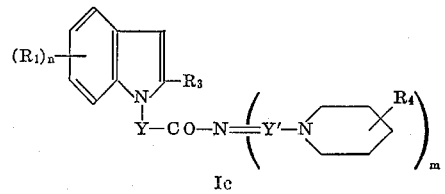

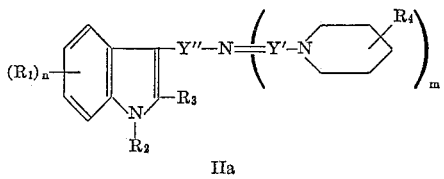

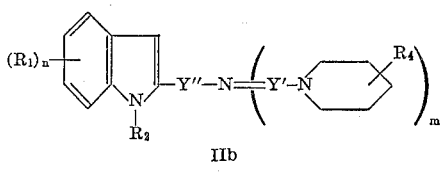

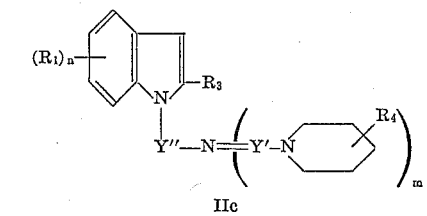

In the above general Formulas Ia, b, c and IIa, b, c, $R_1$ is hydrogen, hydroxy, lower-alkoxy, monocarbocyclic aryl-lower-alkoxy, methylenedioxy, lower-alkylmercapto, lower-alkylsulfonyl, and halogen (including fluorine, chlorine, bromine, and iodine); $R_2$ is hydrogen, lower-alkyl, and monocarbocyclic aryl-lower-alkyl; $R_3$ is hydrogen, lower-alkyl and monocarbocyclic aryl; $R_4$ is hydroxy, hydroxy-lower-alkyl, lower-alkanoyloxy, monocarbocyclic aroyloxy, lower - alkanoyloxy - lower - alkyl, monocarbocyclic aroyloxy-lower-alkyl, unsubstituted-carbamyl, N-lower-alkylcarbamyl, N,N-di-lower-alkylcarbamyl, N-lower-alkenylcarbamyl, N,N-di-lower-alkenylcarbamyl, lower - alkanoylamino, lower - alkyl, monocarbocyclic arylmethyl, and cycloalkyl-lower-alkyl; Y is lower-alkylene containing from one to six carbon atoms; Y' is lower-alkylene containing from two to six carbon atoms; Y'' is lower-alkylene containing from two to seven carbon atoms; $n$ is an integer from one to two; and $m$ is the integers 1 and 2. When $m$ is 1, the third valence on the amino nitrogen atom of the (1-piperidyl)-lower-alkylamino group is taken up by an atom of hydrogen.

When $R_1$ is a lower - alkoxy, lower - alkylmercapto, or lower - alkylsulfonyl radical, the lower - alkyl portion of said radicals can contain from one to four carbon atoms and can be straight or branched. Thus $R_2$ is, inter alia, methoxy, ethoxy, isobutoxy, methylmercapto, n-butylmercapto, methysulfonyl, n-butylsulfonyl, and the like.

When $R_2$, $R_3$, or $R_4$ is lower-alkyl, it can contain from one to four carbon atoms and can be either straight or branched. Thus $R_2$, $R_3$, and $R_4$ each can be, inter alia, methyl, ethyl, isopropyl, n-butyl and the like.

When $R_1$ is monocarbocyclic aryl - lower - alkoxy, or when $R_2$ is monocarbocyclic aryl - lower - alkyl, or when $R_3$ is monocarbocyclic aryl, or when $R_4$ is monocarbocyclic arylmethyl, the monocarbocyclic aryl portion of said radicals is phenyl or phenyl substituted by from one to about three substituents exemplified by lower - alkyl (for example methyl or isopropyl) lower-alkoxy (for example methoxy, ethoxy or n - butoxy), halogen (including fluorine, chlorine, bromine and iodine), lower - alkanoylamino (for example formyl- amino, acetylamino or propionylamino), lower - alkyl-mercapto (for example methylmercapto or n - butyl-mercapto), lower - alkylsulfonyl (for example methyl-sulfonyl or n - butylsulfonyl), and the like. When more than one of such substituents are present, they can be the same or different and can occupy any of the available positions with respect to one another. When $R_1$ is monocarbocyclic aryl - lower - alkoxy or when $R_2$ is monocarbocyclic aryl - lower - alkyl, the lower - alkoxy or lower - alkyl portions of said radicals can contain one or two carbon atoms. Thus $R_1$ is benzyloxy or 2 - phenyl-ethoxy, and $R_2$ is benzyl or 2 - phenylethyl or such radicals substituted by one or more substituents of the nature described above.

When $R_4$ is hydroxy, lower - alkanoyloxy, monocarbo-cyclic aroyloxy or lower - alkanoylamino, said radicals can occupy either the 3- or 4-positions of the piperidine ring, and when $R_4$ is hydroxy - lower - alkyl, lower-alkanoyloxy - lower - alkyl, monocarbocyclic aroyloxy-lower - alkyl, unsubstituted - carbamyl, N - lower - alkyl-carbamyl, N,N - di - lower - alkylcarbamyl, N - lower-alkenylcarbamyl, N,N - di - lower - alkenylcarbamyl, lower - alkyl, monocarbocyclic arylmethyl, or cycloalkyl-lower - alkyl, said radicals can occupy either the 2-, 3-, or 4-positions of the piperidine ring.

When $R_4$ is hydroxy-lower-alkyl, lower-alkanoyloxy-lower - alkyl, or monocarbocyclic aroyloxy - lower - alkyl, the hydroxy - lower - alkyl or oxy - lower - alkyl portions of said radicals can contain from one to six carbon atoms and can be either straight or branched. Thus $R_4$ is hydroxymethyl, 2 - hydroxyethyl, 1 - hydroxyethyl, 3 - hydroxypropyl, 4 - hydroxybutyl, 6 - hydroxyhexyl, and the like or a lower - alkanoyloxy or monocarbo-cyclic aroyloxy ester thereof of a nature to be herein-after described.

When $R_4$ is lower - alkanoyloxy, lower - alkanoyloxy-lower - alkyl, or lower - alkanoylamino, the lower-alkanoyl portion of said radicals can contain from one to about four carbon atoms and can be straight or branched. Thus $R_4$ comprehends, inter alia, formyloxy, acetoxy, isobutyroxy, 2 - formyloxyethyl, 3 - acetoxy-propyl, 6 - isobutyroxyhexyl, formylamino, acetylamino, propionylamino, and the like.

When $R_4$ is monocarbocyclic aroyloxy or monocarbo-cyclic aroyloxy - lower - alkyl, the monocarbocyclic aroyloxy portion of said radicals is benzoyloxy or ben-zoyloxy substituted by from one to three substituents of the nature described above in the definition of the monocarbocyclic aryl moiety of the groups $R_1$, $R_2$, $R_3$, and $R_4$.

When $R_4$ is N - lower - alkylcarbamyl or N,N - di-lower - alkylcarbamyl, the lower - alkyl portion of said radicals can contain from one to four carbon atoms and can be either straight or branched, and when $R_4$ is N,N-di - lower - alkylcarbamyl, the two lower - alkyl groups can be the same or different. Thus $R_4$ comprehends, inter alia, N - methylcarbamyl, N - ethylcarbamyl, N-isobutylcarbamyl, N,N - dimethylcarbamyl, N - ethyl-N - methylcarbamyl, N,N - dibutylcarbamyl and the like.

When $R_4$ is N - lower - alkenylcarbamyl or N,N - di-lower - alkenylcarbamyl, the lower - alkenyl portion of said radicals can contain from three to four carbon atoms and can be either straight or branched, and when $R_4$ is N,N - di - lower - alkenylcarbamyl, the two lower-alkenyl groups can be the same or different. Thus $R_4$ comprehends, inter alia, N - [1 - (2 - propenyl)]car-bamyl, N - [1 - (2 - methyl - 2 - propenyl)]carbamyl, N,N - bis[1 - (2 - propenyl)]carbamyl, N - [1 - (2-propenyl)] - N - [1 - (2 - methyl - 2 - propenyl)]car-bamyl, and the like.

When $R_4$ is cycloalkyl - lower - alkyl the cycloalkyl moiety can contain from three to seven ring carbon atoms and the lower-alkyl moiety can contain from one to two carbon atoms. Thus $R_4$ comprehends, inter alia, cyclopropylmethyl, cyclobutylmethyl, cyclopentylmethyl, cyclohexylmethyl, 2 - (cyclohexyl)ethyl, cycloheptyl methyl, and the like.

In the above general Formulas Ia, b, c and IIa, b, c, Y is lower-alkylene containing from one to six carbon atoms and can be straight or branched. Thus Y compre-hends such groups, inter alia, as methylene ($-CH_2-$), 1,2-ethylene($-CH_2CH_2-$), 1,1-ethylene

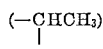

1,3-propylene($-CH_2CH_2CH_2-$), 1,2-(2-methylethylene)

1,4-butylene [$-(CH_2)_4-$], 1,6-hexylene [$-(CH_2)_6-$], and the like.

In the above general Formulas Ia, b, c and IIa, b, c, Y' is lower-alkylene containing from two to six carbon atoms, can be straight or branched and interposes at least two car-bon atoms between the piperidyl nitrogen atom and the amino nitrogen atom of the N-[(1-piperidyl)-lower-al-kyl]-amino group in the compounds of Formulas Ia, b, c and IIa, b, c.

In the above general Formulas Ia, b, c and IIa, b, c, Y" is lower-alkylene containing from two to seven carbon atoms, can be straight or branched and, in compounds of Formula IIc, interposes at least two carbon atoms between the 1-indolyl nitrogen atom and the amino nitrogen atom of the N-(1-indolyl-lower-alkyl)amino group.

The compounds of Formulas Ia, b, and c where $R_4$ is other than hydroxy or hydroxy-lower-alkyl are prepared by reacting an N-[(1-piperidyl)-lower-alkyl]amine or an N,N-bis-[(1-piperidyl)-lower-alkyl]amine having the for-mula

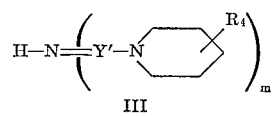

where $R_4$, Y', and $m$ have the meanings given above with a mixed anhydride of a lower-alkyl carbonic acid and a (3-, 2-, or 1-indolyl)-lower-alkanoic acid. The latter have the formula

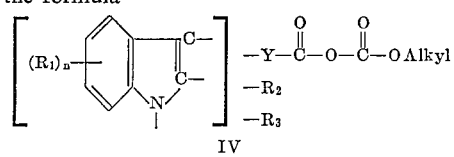

where $R_1$, $R_2$, $R_3$, Y, and $n$ have the meanings given above, Alkyl is lower-alkyl containing from one to four carbon atoms, and where any one of the three free valences on the indole nucleus at the 3-, 2-, and 1-positions is taken up by the

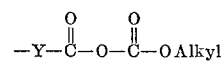

group, and the valences at the 1- and 2-positions, when not taken up by the

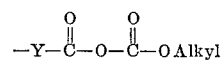

group, are taken up by the groups $R_2$ and $R_3$, respectively. The compounds of Formula IV thus can also be repre-sented by the formulas

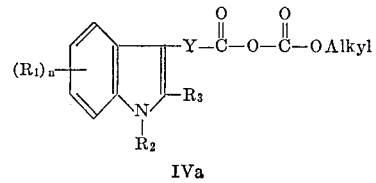

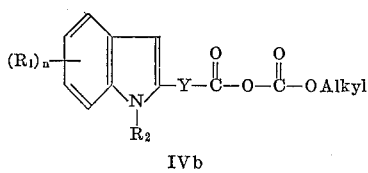

IVb

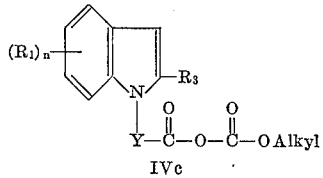

IVc

The reaction is preferably carried out in an organic solvent inert under the conditions of the reaction, for example anhydrous acetone, ether, ethylene dichloride, and the like. Acetone is the preferred solvent.

The mixed anhydrides of Formulas IVa, b, and c are prepared, in situ, by reacting a (3-, 2-, or 1-indolyl)-lower-alkanoic acid with a lower-alkyl haloformate in the presence of an acid-acceptor, for example triethylamine, at a temperature between about −20° C. and 20° C. to give a mixed anhydride of a lower-alkyl carbonic acid and the (3-, 2-, or 1-indolyl)-lower-alkanoic acid. The purpose of the acid-acceptor is to take up the hydrogen halide which is split out during the course of the reaction and is a basic substance which forms water-soluble by-products easily separable from the main product. The mixed anhydrides are reacted directly, without isolation, with the amine as described above.

The compounds of Formulas Ia, b and c where $R_4$ is hydroxy or hydroxy-lower-alkyl are prepared by reacting an N-[(1 - piperidyl)-lower-alkyl]amine or an N,N-bis-[(1-piperidyl)-lower-alkyl]amine of Formula III where $R_4$ is hydroxy or hydroxy-lower-alkyl with a (3-, 2-, or 1-indolyl)-lower-alkanoyl halide in the presence of a basic catalyst, for example pyridine, triethylamine, and the like. The reaction is preferably carried out in an organic solvent inert under the conditions of the reaction, for example anhydrous acetone, methylene dichloride, ethylene dichloride, and the like.

The compounds of Formulas IIa, b, and c are prepared by reacting an N-[(1-piperidyl)-lower-alkyl]amine or an N,N-bis-[(1-piperidyl)-lower-alkyl]amine of Formula III at a temperature between about 50° C. and about 150° C. in the presence of an acid-acceptor with a (3-, 2-, or 1-indolyl)-lower-alkyl halide having the formula

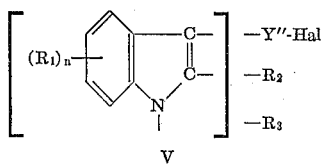

V where $R_1$, $R_2$, $R_3$, $Y''$ and $n$ have the meanings given above, Hal is halogen, and where any one of the three free valences on the indole nucleus at the 3-, 2-, and 1-positions is taken up by the —Y″—Hal group, and the valences at the 1- and 2-positions when not taken up by the —Y″—Hal group, are taken up by the groups $R_2$ and $R_3$, respectively. The compounds of Formula V thus can also be represented by the formulas

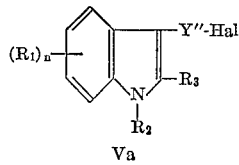

Va

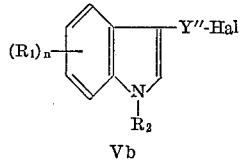

Vb

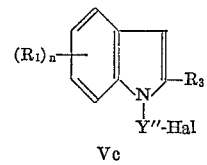

Vc

The reaction is preferably carried out in an organic solvent, inert under the conditions of the reaction, for example anhydrous ethanol, isopropanol, acetonitrile, and the like. The purpose of the acid-acceptor is to take up the hydrogen halide which is split out during the course of the reaction. The acid-acceptor is a basic substance which forms water-soluble by-products easily separable from the main product of the reaction and includes such substances as alkali metal salts of weak acids, e.g. sodium carbonate, sodium bicarbonate, potassium carbonate, sodium acetate, sodium alkoxides, and the like. The acid-acceptor can also be in the form of an excess quantity of the N-[(1-piperidyl)-lower-alkyl]amine or N,N-bis-[(1-piperidyl)-lower-alkyl]amine.

Alternatively the compounds of Formulas IIa, b, and c where $R_4$ is hydroxy, hydroxy-lower-alkyl, lower-alkyl, monocarbocyclic arylmethyl, or cycloalkyl-lower-alkyl can be prepared from the respective compounds of Formulas Ia, b, and c where $R_4$ is, respectively, a hydroxy, (or acyloxy ester thereof), hydroxy-lower-alkyl (or acyloxy ester thereof), lower-alkyl, monocarbocyclic arylmethyl, or cycloalkyl-lower-alkyl group by reduction of the latter with an alkali metal aluminum hydride. The reaction is carried out at a temperature in the range from about 0° C. to about 65° C. in an organic solvent inert under the conditions of the reaction, for example diethyl ether or tetrahydrofuran. It is preferred to use lithium aluminum hydride.

When $R_4$ in the compounds of Formulas Ia, b, and c is a hydroxy or hydroxy-lower-alkyl group, the respective compounds of Formulas IIa, b, and c are produced in which the group $R_4$ remains unchanged in the reduction with the alkali metal aluminum hydride. But when $R_4$ in the compounds of Formulas Ia, b, and c is an ester of the hydroxy or hydroxy-lower-alkyl group, that is a lower-alkanoyloxy, monocarbocyclic aroyloxy, lower-alkanoyloxy-lower-alkyl, or monocarbocyclic aroyloxy-lower-alkyl group, the ester group is also reduced in the reaction to give the compounds of Formulas IIa, b, and c where $R_4$ is a hydroxy or hydroxy-lower-alkyl group as the case may be. In such cases where $R_4$ in the compounds of Formulas Ia, b, and c is an ester, an additional amount of the alkali metal aluminum hydride must be used in the reaction mixture to insure the complete reduction of both the $R_4$ substituent and the amide carbonyl group. That is, a one molar equivalent of an alkali metal aluminum hydride is required to reduce the ester group in addition to the one molar equivalent required to reduce the lower-alkanoyl amide group.

The compounds of Formulas Ia, b, and c and IIa, b, and c where $R_4$ is a lower-alkanoyloxy or monocarbocyclic aroyloxy ester of a hydroxy or hydroxy-lower-alkyl group can be prepared by reacting the compounds of Formulas Ia, b, and c, and IIa, b, and c where $R_4$ is a hydroxy or hydroxy-lower-alkyl group with an acylating agent, for example a lower-alkanoyl halide, a lower-alkanoyl anhydride, a monocarbocyclic aroyl halide, or a monocarbocyclic aroyl anhydride. The reaction is carried out in an organic solvent inert under the conditions of the reaction, for example methylene dichloride, ethylene dichloride, benzene, toluene, and the like, in the presence of a basic catalyst, for example pyridine, triethylamine, and the like.

The intermediate N-[(1-piperidyl)-lower-alkyl]amines and N,N-bis-[(1-piperidyl)-lower-alkyl]amines of the Formula III are prepared by reducing with hydrogen in the presence of a rhodium-on-alumina catalyst a 1-(cyano-lower-alkyl)piperidine having the formula

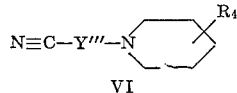
VI where Y′′′ is lower-alkylene containing from one to five carbon atoms and $R_4$ has the meaning given above. The reduction is carried out in an organic solvent inert under the conditions of the reaction, for example methanol, ethanol, isopropanol and the like, and at hydrogen pressures in the range from about 50 pounds p.s.i. to about 1000 pounds p.s.i. In the reduction both the N-mono- and N,N-bis-[(1-piperidyl)-lower-alkyl]amines are produced. When the reaction is carried out in a neutral medium, that is a medium containing only the 1-(cyano-lower-alkyl)piperidine of Formula VI, dissolved in the solvent, the N,N-bis-[(1-piperidyl)-lower-alkyl]amines of Formula III ($m$ is 2) are produced predominantly. However, when the reduction is carried out in an ammoniacal medium, that is a medium containing anhydrous ammonia in addition to the 1-(cyano-lower-alkyl)-piperidine in the solvent, the N-mono-[(1-piperidyl)-lower-alkyl] amines of Formula III ($m$ is 1) are produced predominantly.

The 1-(cyano-lower-alkyl)piperidines of Formula VI are prepared by reacting a halo-lower-alkanonitrile with an appropriate substituted piperidine at a temperature between about 50° C. and about 150° C. in the presence of an acid-acceptor. The reaction is represented by the equation

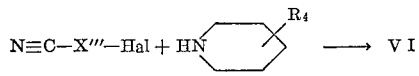

where $R_4$ and Y′′′ have the meanings given above and Hal represents halogen. The reaction is preferably carried out in an organic solvent inert under the conditions of the reaction, for example ethanol, isopropanol, acetonitrile, and the like. The purpose of the acid-acceptor is to take up the hydrogen halide which is split out during the course of the reaction. The acid-acceptor is a basic substance which forms water-soluble by-products easily separable from the main product of the reaction and includes such substances as alkali metal salts of weak acids, e.g. sodium or potassium carbonate, sodium bicarbonate, sodium acetate, sodium alkoxides, and the like. The acid-acceptor can also be in the form of an excess quantity of the substituted-piperidine.

The 1-(cyano-lower-alkyl)piperidines of Formula VI where Y′′′ is a lower-alkylene group interposing two carbon atoms between the cyano group and the piperidine nitrogen atom can also be prepared by reacting an appropriate substituted-piperidine with a 1-lower-alkenylnitrile. The reaction is represented by the equation

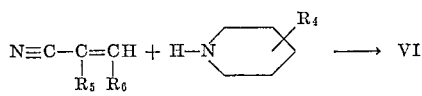

where $R_4$ has the meanings given above and $R_5$ and $R_6$ are hydrogen or lower-alkyl containing a total of three carbon atoms in the alkyl group when only one of $R_5$ and $R_6$ is lower-alkyl and containing a total of three carbon atoms in both alkyl groups when both of $R_5$ and $R_6$ is lower-alkyl. The reaction is carried out at a temperature between about 0° C. and about 30° C. and can be carried out either with or without a solvent. It is preferred to use either water or an excess of the 1-lower-alkenylnitrile as the solvent.

The novel compounds of the instant invention are the compounds of Formulas Ia, b, and c and IIa, b and c and their acid-addition and quaternary ammonium salts. The compounds of Formulas Ia, b, and c and IIa, b, and c in free base form, are converted to the acid-addition salt form by interaction of the base with an acid. In like manner, the free bases can be regenerated from the acid-addition salt form in the conventional manner, that is by treating the salts with strong aqueous bases, for example alkali metal hydroxides, alkali metal carbonates, and alkali metal bicarbonates. The bases thus regenerated can then be interacted with the same or a different acid to give back the same or a different acid-addition salt. Thus the novel bases and all of their acid-addition salts are readily interconvertible.

It will thus be appreciated that each of Formulas Ia, b, and c and IIa, b, and c not only represents the structural configuration of the bases of our invention but each is also representative of the respective structural entity which is common to all of our respective compounds of Formulas Ia, b, and c and IIa, b, and c whether in the form of the free bases or in the form of the acid-addition salts of the bases. We have found that by virtue of this common structural entity, the bases and their acid-addition salts have inherent pharmacodynamic activity of a type to be more fully described hereinbelow. This inherent pharmacodynamic activity can be enjoyed in useful form for pharmaceutical purposes by employing the free bases themselves or the acid-addition salts formed from pharmaceutically-acceptable acids, that is, acids whose anions are innocuous to the animal organism in effective doses of the salts so that beneficial properties inherent in the common structural entity represented by the free bases are not vitiated by side-effects ascribable to the anions.

In utilizing this pharmacodynamic activity of the salts of the invention, we prefer of course to use pharmaceutically-acceptable salts. Although water-insolubility, high toxicity, or lack of crystalline character may make some particular salt species unsuitable or less desirable for use as such in a given pharmaceutical application, the water-insoluble or toxic salts can be converted to the corresponding phamaraceutically-acceptable bases by decomposition of the salt with aqueous base as explained above, or alternatively, they can be converted to any desired pharmaceutically-acceptable acid-addition salt by double decomposition reactions involving the anion, for example, by ion-exchange procedures.

Moreover, apart from their usefulness in pharmaceutical applications, our salts are useful as characterizing or identifying derivatives of the free bases or in isolation or purification procedures. Like all of the acid-addition salts, such characterizing or purification salt derivatives can, if desired, be used to regenerate the pharmaceutically-acceptable free bases by reaction of the salts with aqueous base, or alternatively can be converted to a pharmaceutically-acceptable acid-addition salt by, for example, ion-exchange procedures.

It will be appreciated from the foregoing that all of the acid-addition salts of our new bases are useful and valuable compounds regardless of considerations of solubility, toxicity, physical form, and the like, and accordingly are within the purview of the instant invention.

The novel features of the compounds of the invention, then, resides in the concept of the bases and the cationic forms of the new compounds of Formulas Ia, b, and c and IIa, b, and c and not in any particular acid moiety or acid anion associated with the salt forms of our compounds; rather, the acid moieties or anions which can be associated in the salt forms are in themselves neither novel nor critical and therefore can be any acid anion or acid-like substance capable of salt formation with bases. In fact, in aqueous solutions, the base form or water-soluble acid-addition salt form of the compounds of the invention both possess a common protonated cation or ammonium ion.

Thus the acid-addition salts discussed above and claimed herein are prepared from any organic acid, inorganic acid (including organic acids having an inorganic group therein), or organo-metallic acid as exemplified by organic mono- and polycarboxylic acids; such as found, for example, in Beilstein's Organische Chemie, 4th ed., volumes III, IV, IX, X XIV, XVII, XIX, XXI, XXII, and XXV; organic mono- and polysulfonic and -sulfinic acids; such as found, for example, in Beilstein volumes VI, XI, XVI, and XXII; organic phosphonic and phosphinic acids; such as found, for example, in Beilstein volumes XI and XVI; organic acids of arsenic and antimony; such as found, for example, in Beilstein volume XVI; organic heterocyclic carboxylic, sulfonic, and sulfinic acids such as found, for example, in Beilstein volumes XVIII, XXII, and XXV; acidic ion-exchange resins, for example Amberlite® XE–66 resin; and inorganic acids of any acid-forming element or combination of elements, such as found in Mellor, Comprehensive Treatise in Inorganic and Theoretical Chemistry, Longman's, Green and Co., New York, N. Y., volumes I–XVI. In addition, other salt-forming compounds which are acidic in their chemical properties but which are not generally considered as acids in the same sense as carboxylic or sulfonic acids are also considered to be among the numerous acids which can be used to prepare acid-addition salts of the compounds of the invention. Thus there is also comprehended acidic phenolic compounds, such as found, for example, in volume VI of Beilstein, acidic compounds having "activated" or acidic hydrogen atoms, as for example, picrolonic acid, or barbituric acid derivatives having an acidic proton, such as found, for example, in Cox et al. Medicinal Chemistry, vol. IV, John Wiley and Sons, Inc., New York, N.Y. (1959). Also comprehended as salt forming agents are so-called Lewis acids which lack a pair of electrons in the outer "electron shell" and react with basic compounds having an unshared pair of electrons to form salts, for example boron trifluoride.

Thus appropriate acid-addition salts are those derived from such diverse acids as formic acid, acetic acid, isobutyric acid, alpha-mercaptopropionic acid, malic acid, fumaric acid, succinic acid, succinamic acid, tartaric acid, citric acid, lactic aid, benzoic acid, 4-methoxybenzoic acid, phthalic acid, anthranilic acid, 1-naphthalenecarboxylic acid, cinnamic acid, cyclohexanecarboxylic acid, mandelic acid, tropic acid, crotonic acid, acetylene dicarboxylic acid, sorbic acid, 2-furancarboxylic acid, cholic acid, pyrenecarboxylic acid, 2-pyridinecarboxylic acid, 3-indoleacetic acid, quinic acid, sulfamic acid, methanesulfonic acid, isethionic acid, benzenesulfonic acid, p-toluenesulfonic acid, benzenesulfinic acid, butylarsonic acid, diethylphosphinic acid, p-aminophenylarsinic acid, phenylstibnic acid, phenylphosphinous acid, methylphosphinic acid, phenylphosphinic acid, Amberlite® XE–66 resin, hydrofluoric acid, hydrochloric acid, hydrobromic acid, hydriodic acid, perchloric acid, nitric acid, sulfuric acid, phosphoric acid, hydrocyanic acid, phosphotungstic acid, molybdic acid, phosphomolybdic acid, pyrophosphoric acid, arsenic acid, picric acid, picrolonic acid, barbituric acid, boron trifluoride, and the like.

The acid-addition salts are prepared either by dissolving the free base in an aqueous solution containing the appropriate acid and isolating the salt by evaporating the solution, or by reacting the free base and acid in an organic solvent, in which case the salt separates directly or can be obtained by concentration of the solution.

The quaternary ammonium salts of the compounds of Formulas Ia, b, and c and IIa, b, and c are obtained by the addition of esters of strong acids to the free base form of the compounds, said esters having a molecular weight less than about 300. A preferred class of esters comprises alkyl, alkenyl, and monocarbocyclic aryl-lower-alkyl esters of strong inorganic acids or organic sulfonic acids, including such compounds as methyl chloride, methyl bromide, methyl iodide, ethyl bromide, propyl chloride, allyl chloride, allyl bromide, methyl sulfate, methyl benzenesulfonate, methyl p-toluenesulfonate, benzyl chloride, benzyl bromide, and substituted benzyl halides, for example p-chlorobenzyl chloride, 3,4-dichlorobenzyl chloride, pentachlorobenzyl chloride, p-nitrobenzyl chloride, p-methoxybenzyl chloride, and the like.

The quaternary ammonium salts are prepared by mixing the free base and ester of a strong acid in an inert solvent. Heating may be used to facilitate the reaction, although salt formation usually takes place readily at room temperature. The quaternary ammonium salt separates directly or can be obtained by concentration of the solution.

As in the case of the acid-addition salts, water-insolubility, high toxicity, or lack of crystalline character may make some quaternary ammonium salt species unsuitable or less desirable for use as such in a given pharmaceutical application, the water-insoluble or toxic salts may be converted to the corresponding pharmaceutically-acceptable salts by double decomposition reactions involving the anion, for example, by ion-exchange procedures. Alternatively, if the anion of the original quaternary salt forms a water-insoluble silver salt, the quarternary salt will react with silver oxide in aqueous medium to form the corresponding quaternary ammonium hydroxide, the original anion being removed as a precipitate. The quaternary ammonium hydroxide solution can then be neutralized with any desired acid, weak or strong, to produce a new quaternary ammonium salt in which the anion is different from that of the original salt. In this way quaternary ammonium salts in which the anion is derived from a weak acid are formed.

Pharmacological evaluation of the compounds of Formulas Ia, b, and c have shown that they possess pharmacodynamic properties, in particular, hypotensive, monoamine oxidase inhibitory, and coronary dilator activities thus indicating their usefulness as blood pressure lowering agents, psychic energizers, and coronary dilators. The compounds of Formulas IIa, b, and c have also been shown to possess hypotensive and mild analgesic activities thus indicating their usefulness as blood pressure lowering agents and mild analgesics.

The compounds can be prepared for use by dissolving under sterile conditions a salt form of the compounds in water (or an equivalent amount of a non-toxic acid if the free base is used), or in a physiologically compatible aqueous medium such as saline, and stored in ampoules for intramuscular injection. Alternatively, they can be incorporated in unit dosage form as tablets or capsules for oral administration either alone or in combination with suitable adjuvants such as calcium carbonate, starch, lactose, talc, magnesium stearate, gum acacia, and the like. Still further the compounds can be formulated for oral administration in aqueous alcohol, glycol or oil solutions or oil-water emulsions in the same manner as conventional medicinal substances are prepared. When used as hypotensive agents, they are formulated and used in the same manner as conventional hypotensive agents, such as reserpine preparations, and indeed can be used advantageously in combination with such hypotensive agents.

The structures of the compounds of the invention are established by their mode of synthesis and corroborated by the correspondence between calculated values for the elements and values found by chemical analysis.

The following examples will further illustrate the invention without the latter being limited thereto. In the examples, the symbols $N_T$ and $N_B$ refer to total nitrogen and basic nitrogen, respectively.

PREPARATION OF INTERMEDIATES

*Example 1*

4-carbomethoxy-1-(2-cyanoethyl)piperidine [VI; $R_4$ is 4-COOCH$_3$ Y''' is CH$_2$CH$_2$]: To a solution containing 37.9 g. (0.211 mole) of 4-carbomethoxypiperidine hydrochloride and 23.5 g. (0.23 mole) of triethylamine in 175 ml. of water was added 12.32 g. (0.23 mole) of acrylonitrile with stirring while maintaining the temperature at about 10° C. To the mixture was then added 80 g. of sodium chloride, the solution was stirred for several hours, filtered, and the filter cake washed with chloroform. The chloroform extract was separated from the filtrate and the raffinate extracted with chloroform. The chloroform extracts, after drying and concentration in vacuo, afforded about 35 ml. of a light yellow oil which was distilled in vacuo giving 16.78 g. of 4-carbomethoxy-1 - (2 - cyanoethyl)piperidine, B.P. 123.0–124.4° C./0.38 mm., M.P. 42.4–43.4° C. (corr.).

The compounds of the following examples were prepared according to the procedure described above in Example 1.

Example 2

(a) 2-carbethoxypiperidine was reacted with acrylonitrile in water to give 2-carbethoxy-1-(2-cyanoethyl)piperidine [VI; $R_4$ is 2-COOC$_2$H$_5$, Y''' is CH$_2$CH$_2$], B.P. 64.1–66.5° C./0.029–0.031 mm.; 2-carbethoxy-1-(2-cyanoethyl)piperidine hydrochloride, M.P. 185–188° C. (uncorr.) (recrystallized from an ethanol-ether mixture.

(b) 3 - carbomethoxypiperidine hydrochloride was reacted with acrylonitrile in water in the presence of triethylamine to give 3-carbomethoxy-1-(2-cyanoethyl)piperidine [VI; $R_4$ is 3-COOCH$_3$, Y''' is CH$_2$CH$_2$], B.P. 68–72° C./0.023–0.025 mm., $n_D^{25}$=1.4737; 3-carbomethoxy-1 - (2 - cyanoethyl)piperidine hydrochloride, M.P. 190–192° C. (uncorr.) (recrystallized from an ethanol-ether mixture).

(c) 4 - carboisobutoxypiperidine hydrochloride was reacted with acrylonitrile in water in the presence of triethylamine to give 4-carboisobutoxy-1-(2-cyanoethyl)piperidine [VI; $R_4$ is 4 - COOCH$_2$CH(CH$_3$)$_2$, Y''' is CH$_2$CH$_2$], B.P. 205–207° C./16 mm., $n_D^{25}$=1.4660.

(d) 4-hydroxypiperidine was reacted with acrylonitrile in water to give 4-hydroxy-1-(2-cyanoethyl)piperidine [VI; $R_4$ is 4-OH, Y''' is CH$_2$CH$_2$], B.P. 119–122° C./0.25–0.46 mm., $n_D^{25}$=1.4961.

(e) 4-hydroxymethylpiperidine was reacted with acrylonitrile in water to give 4-hydroxymethyl-1-(2-cyanoethyl)-piperidine [VI; $R_4$ is 4-CH$_2$OH, Y''' is CH$_2$CH$_2$], B.P. 102.0–104.1° C./0.065–0.071 mm., $n_D^{25}$=1.4930.

(f) 3-hydroxymethylpiperidine hydrochloride was reacted with acrylonitrile in water in the presence of triethylamine to give 3-hydroxymethyl-1-(2 - cyanoethyl)-piperidine [VI; $R_4$ is 3-CH$_2$OH, Y''' is CH$_2$CH$_2$], B.P. 98–100° C./0.035–0.04 mm., $n_D^{25}$=1.4948.

(g) 4-(3-hydroxypropyl)piperidine was reacted with acrylonitrile in water to give 4-(3-hydroxypropyl)-1-(2-cyanoethyl)-piperidine [VI; $R_4$ is 4-CH$_2$CH$_2$CH$_2$OH, Y''' is CH$_2$CH$_2$], M.P. 44.2–45.4° C. (corr.) (recrystallized from hexane).

(h) 4-carbamylpiperidine acetate was reacted with acrylonitrile in water in the presence of triethylamine to give 4-carbamyl-1-(2-cyanoethyl)piperidine [VI; $R_4$ is 4-CONH$_2$, Y''' is CH$_2$CH$_2$], M.P. 151.0–152.6° C. (corr.) (recrystallized from ethyl acetate).

(i) 4-(N-methylcarbamyl)piperidine hydrochloride was reacted with acrylonitrile in water in the presence of triethylamine to give 4-(N-methylcarbamyl)-1-(2-cyanoethyl)piperidine [VI; $R_4$ is 4-CONHCH$_3$, Y''' is CH$_2$CH$_2$], M.P. 110.6–111.8° C. (corr.) (recrystallized from ethyl acetate).

(j) 4-(N,N-dimethylcarbamyl)piperidine hydrochloride was reacted with acrylonitrile in water in the presence of triethylamine to give 4-(N,N-dimethylcarbamyl)-1-(2-cyanoethyl)piperidine [VI; $R_4$ is 4-CON(CH$_3$)$_2$, Y'''' is CH$_2$CH$_2$], M.P. 65.0–66.8° C. (corr.) (recrystallized from an ethyl acetate-hexane mixture).

(k) 4-(N-ethylcarbamyl)piperidine hydrochloride was reacted with acrylonitrile in water in the presence of triethylamine to give 4-(N-ethylcarbamyl)-1-(2-cyanoethyl)piperidine [VI; $R_4$ is 4-CONHC$_2$H$_5$, Y'''' is CH$_2$CH$_2$], M.P. 110.6–111.8° C. (corr.) recrystallized from a benzene-hexane mixture).

(l) 4-(N,N-diethylcarbamyl)piperidine hydrochloride was reacted with acrylonitrile in water in the presence of triethylamine to give 4-(N,N-diethylcarbamyl)-1-(2-cyanoethyl)piperidine [VI; $R_4$ is 4-CON(C$_2$H$_5$)$_2$, Y''' is CH$_2$CH$_2$], B.P. 151.159° C./0.073–0.113 mm., $n_D^{25}$=1.4951

(m) 4-isopropylpiperidine was reacted with acrylonitrile in benzene to give 4-isopropyl-1-(2 - cyanoethyl) piperidine [VI; $R_4$ is 4-CH(CH$_3$)$_2$, Y'''' is CH$_2$CH$_2$], B.P. 87–91° C./0.72 mm., $n_D^{25}$=1.4680.

(n) 4-benzylpiperidine was reacted with acrylonitrile in benzene to give 4-benzyl-1-(2-cyanoethyl)piperidine [VI; $R_4$ is 4-C$_6$H$_5$CH$_2$, Y''' is CH$_2$CH$_2$], B.P. 131.5–135° C./0.08 mm., $n_D^{25}$=1.5289.

(o) 4-cyclohexylmethylpiperidine was reacted with acrylonitrile in benzene to give 4-cyclohexylmethyl-1-(2-cyanoethyl)piperidine [VI; $R_4$ is C$_6$H$_{11}$CH$_2$, Y''' is CH$_2$CH$_2$], B.P. 102.0–112° C./0.12 mm., $n_D^{25}$=1.4889.

(p) 3-acetylaminopiperidine hydrochloride was reacted with acrylonitrile in water in the presence of triethylamine to give 3-acetylamino-1-(2-cyanoethyl)piperidine [VI; $R_4$ is 3-CH$_3$CONH, Y''' is CH$_2$CH$_2$], M.P. 69.2–73.2° C. (corr.) (recrystallized from an ethyl acetate-ether mixture).

Similar to the procedure described above in Example 1, there can be obtained:

4 - (3-isobutyroxypropyl) - 1 - (2-cyanoethyl)piperidine [VI; $R_4$ is CH$_2$CH$_2$CH$_2$OCOC$_3$H$_7$, Y''' is CH$_2$CH$_2$] from 4-(3-isobutyroxypropyl)-piperidine and acrylonitrile, 4-formyloxy-1-(2-cyanoethyl)piperidine [VI; $R_4$ is HCOO, Y''' is CH$_2$CH$_2$] from 4-formyloxypiperidine and acrylonitrile.

4-cyclopropylmethyl-1-(2-cyanoethyl)piperidine [VI; $R_4$ is 4-C$_3$H$_5$CH$_3$, Y''' is CH$_2$CH$_2$] from 4 cyclopropylmethylpiperidine and acrylonitrile.

Example 3

4-carbamyl-1-cyanomethylpiperidine [VI; $R_4$ is 4-COHN$_2$, Y''' is CH$_2$]: By heating molar equivalent amounts of 4-carbamylpiperidine, α-bromoacetonitrile, and sodium carbonate in an ethanol solvent, and isolating the product from a slightly alkaline mixture, there can be obtained 4-carbamyl-1-cyanomethylpiperidine.

Example 4

4-carbamyl-1-(3-cyanopropyl)piperidine [VI; $R_4$ is 4-CONH$_2$, Y''' is CH$_2$CH$_2$CH$_2$]: By heating molar equivalent amounts of 4-carbamylpiperidine, γ-bromopropionitrile, and sodium carbonate in an ethanol solvent, and isolating the product from a slightly alkaline mixture, there can be obtained 4-carbamyl-1-(3-cyanopropyl) piperidine.

Example 5

4-carbamyl-1-(5-cyanopentyl)piperidine [VI; $R_4$ is 4-CONH$_2$, Y''' is (CH$_2$)$_5$]: By heating molar equivalent amounts of 4-carbamylpiperidine, ε-bromocapronitrile, and sodium carbonate in an ethanol solvent, and isolating the product from a slightly alkaline mixture, there can be obtained 4-carbamyl-1-(5-cyanopentyl)piperidine.

Example 6

N-[3-(4-hydroxy-1-piperidyl)propyl]amine [III; $R_4$ is 4-HO, Y' is (CH$_2$)$_3$, m is 1]: To a solution of 26.41 g. (0.17 mole) of 4-hydroxy-1-(2-cyanoethyl)piperidine, in 120 ml. of ethanol saturated with anhydrous ammonia, was added 3.0 g. of a 5 percent rhodium-on-alumina catalyst in a high pressure autoclave. The mixture was reduced with hydrogen at an initial pressure of 1030 pounds p.s.i. and an initial temperature of about 18° C.

Reduction was complete in about two and one half hours. The catalyst was removed by filtration and the filtrate evaporated to dryness in vacuo giving a dark viscous oil which was distilled in vacuo, giving 17.96 g. of an oil boiling at 93.8–98.0° C./0.12–0.15 mm. and a flask residue. The distillate was redistilled yielding 10.81 g. of N-[3-(4-hydroxy - 1 - piperidyl)propyl]amine, B.P. 103.8–108.0° C./0.05–0.07 mm. $n_D^{25}=1.5058$.

Analysis.—Calcd. for $C_8H_{18}N_2O$: C, 60.72; H, 11.46; N, 17.70. Found: C, 60.61; H, 11.29; N, 17.69.

Example 7

N,N - bis - [3 - (4-hydroxy-1-piperidyl)propyl]amine [III; $R_4$ is 4-OH, Y' is $(CH_2)_3$, m is 2]: The flask residue from Example 6 was distilled at 0.002 mm. to give 3.64 g. of N,N - bis-[3-(4-hydroxy-1-piperidyl)propyl]amine, B.P. 186–193° C., $n_D^{25}=1.5197$.

Analysis.—Calcd. for $C_{16}H_{33}N_3O_2$: C, 64.17; H, 11.11; N, 14.03. Found: C, 64.14; H, 11.12; N, 14.02.

The compounds of the following examples were prepared according to the procedure described above in Example 6.

Example 8

(a) 4-(3-hydroxypropyl) - 1 - (2-cyanoethyl)piperidine, in ethanol, was reduced under 790 pounds p.s.i. of hydrogen at a temperature of 25° C. over a 5 percent rhodium-on-alumina catalyst to give N,N-bis-{3-[4-(3-hydroxypropyl)-1-piperidyl]propyl}amine [III; $R_4$ is 4-$HOCH_2CH_2CH_2$, Y' is $(CH_2)_3$, m is 2], B.P. 180.0–185.5° C./0.003–0.008 mm.

A portion of the latter was converted to the trihydrochloride salt and the latter recrystallized from hot isopropanol giving N,N - bis - {3-[4-(3-hydroxypropyl)-1-piperidyl]propyl}amine trihydrochloride, M.P. 191.2–199.4° C. (corr.).

Analysis.—Calcd. for $C_{22}H_{45}N_3O_2.3HCl$: N, 8.52; Cl, 21.58. Found: N, 8.22; Cl, 21.22.

(b) 4-carbamyl-1-(2-cyanoethyl)piperidine, in ethanol saturated with ammonia, was reduced under 210 pounds p.s.i. of hydrogen at a temperature of 25° C. over a 5 percent rhodium-on-alumina catalyst. The product was isolated in the form of the free base giving crude material of M.P. 120–144° C. (uncorr.) The latter was leeched with acetone, and the acetone insolubles were recrystallized from a benzene-hexane mixture giving N-[3-(4-carbamyl-1-piperidyl)propyl]amine [III; $R_4$ is 4-$CONH_2$, Y' is $(CH_2)_3$, m is 1], M.P. 85–88° C. (uncorr.).

(c) N-{3-[4-(N-methylcarbamyl) - 1 - piperidyl]propyl}amine dihydrochloride [III; $R_4$ is 4-$CONHCH_3$, Y' is $(CH_2)_3$, m is 1] was prepared by reducing 4-(N-methylcarbamyl)-1-(2-cyanoethyl)piperidine, in methanol saturated with ammonia, with hydrogen over a 5 percent rhodium-on-alumina catalyst. The reduction was carried out under an initial hydrogen pressure of 208 pounds p.s.i. The catalyst was removed by filtration and the solvent removed under reduced pressure giving a waxy white solid which was extracted with boiling acetone and filtered. The insoluble material (M.P. 180–191° C.) was set aside. The extracts were taken to dryness and extracted with 500 ml. of ether and filtered. The ether extracts were taken to dryness under reduced pressure giving crude material of M.P. 90–94° C. The latter was converted to the hydrochloride salt and recrystallized from an ethanol-ether mixture giving N-{3-[4-(N-methylcarbamyl)-1-piperidyl]propyl}amine dihydrochloride, M.P. 239.6–240.6° C. (corr.).

Analysis.—Calcd. for $C_{10}H_{21}N_3O.2HCl$: N, 15.44; Cl, 26.05. Found: N, 15.35; Cl, 26.26.

(d) The acetone insoluble material isolated above in Example 8(c) of M.P. 180–191° C. was recrystallized once from acetone and once from an ethanol-acetone mixture to give N,N-bis-{3-[4-(N-methylcarbamyl)-1-piperidyl]propyl}amine [III; $R_4$ is 4-$CONHCH_3$, Y' is $(CH_2)_3$, m is 2], M.P. 203.0–203.8° C. (corr.).

Analysis.—Calcd. for $C_{20}H_{39}N_5O_2$: $N_T$, 18.36; $N_B$, 11.01. Found: $N_T$, 18.29; $N_B$, 11.02.

(e) 4-(N,N-dimethylcarbamyl) - 1 - (2 - cyanoethyl) piperidine, in 300 ml. of ethanol saturated with anhydrous ammonia, was reduced under 197 pounds p.s.i. of hydrogen at a temperature of 25° C. over a rhodium-on-alumina catalyst to give N-{3-[4-(N,N-dimethylcarbamyl)-1-piperidyl]propyl}amine [III; $R_4$ is 4-$CON(CH_3)_2$, Y' is $(CH_2)_3$, m is 1], B.P. 123–124° C./0.09 mm. $n_D^{25}=1.5040$.

Analysis.—Calcd. for $C_{11}H_{23}N_3O$: $N_T$, 19.71; $N_B$, 13.14. Found: $N_T$, 19.39; $N_B$, 12.83.

(f) 4-(N,N-dimethylcarbamyl) - 1 - (2 - cyanoethyl) piperidine, in ethanol, was reduced with hydrogen over a 5 percent rhodium-on-alumina catalyst. The catalyst was removed by filtration, the solvent removed under reduced pressure, and the residue was extracted with boiling hexane. The insoluble material was extracted with ether, the ether extracts taken to dryness and the residue extracted with hexane and the extracts combined with the hexane extracts from above. The latter were taken to dryness giving crude material which on repeated recrystallization from hexane gave N,N-bis-{3-[4-(N,N-dimethylcarbamyl) - 1 - piperidyl]-propyl}amine [III; $R_4$ is 4-$CON(CH_3)_2$, Y' is $(CH_2)_3$, m is 2], M.P. 87.8–88.6° C. (corr.).

Analysis.—Calcd. for $C_{22}H_{43}N_5O_2$: C, 64.51; H, 10.58; N, 17.10. Found: C, 64.50; H, 10.41; N, 17.12.

(g) 4-(N-ethylcarbamyl) - 1 - (2 - cyanoethyl)piperidine, in ethanol saturated with anhydrous ammonia, was reduced under 61 pounds p.s.i. of hydrogen over a rhodium-on-alumina catalyst. After removal of the catalyst, the solvent was removed in vacuo and the white solid residue extracted with ether and the ether extracts taken to dryness giving a white waxy solid. The latter was converted to the dihydrochloride salt and recrystallized from an ethanol-ether mixture giving N-{3-[4-(N-ethylcarbamyl) - 1 - piperidyl]propyl}amine dihydrochloride [III; $R_4$ is 4-$CONHC_2H_5$, Y' is $(CH_2)_3$, m is 1], M.P. 245.0–246.2° C. (corr.).

Analysis.—Calcd. for $C_{11}H_{23}N_3O.2HCl$: N, 14.69; Cl, 24.80. Found: N, 14.62; Cl, 24.50.

(h) 4-(N-ethylcarbamyl) - 1 - (2 - cyanoethyl)piperidine, in ethanol saturated with anhydrous ammonia, was reduced under 59 pounds p.s.i. of hydrogen over a 5 percent rhodium-on-alumina catalyst. The crude product was extracted with ether and filtered. The ether insoluble material was washed with acetone, then with ether and air-dried giving crude material of M.P. 188–189° C. (uncorr.) Recrystallization from an ethanol-ether mixture afforded N,N-bis-{3-[4-(N-ethylcarbamyl)-1-piperidyl]propyl}amine [III; $R_4$ is 4-$CONHC_2H_5$, Y' is $(CH_2)_3$, m is 2], M.P. 191.2–192.8° C. (corr.).

Analysis.—Calcd. for $C_{22}H_{43}N_5O_2$: C, 64.50; H, 10.58; N, 17.10. Found: C, 64.43; H, 10.26; N, 17.42.

4 - (N,N-diethylcarbamyl) - 1 - (2 - cyanoethyl)piperidine, in ethanol saturated with anhydrous ammonia, was reduced under 235 pounds p.s.i. of hydrogen at a temperature of 24° C. over a 5 percent rhodium-on-alumina catalyst. The crude product was taken into ether and allowed to stand overnight. The solid which separated was collected by filtration and the filtrate taken to dryness giving a dark viscous oil which was distilled in vacuo to give N - {3 - [4 - (N,N-diethylcarbamyl) - 1 - piperidyl]propyl}amine [III; $R_4$ is 4-$CON(C_2H_5)_2$, Y' is $(CH_2)_3$, m is 1], B.P. 131–138° C./0.109–0.113 mm., $n_D^{25}=1.4938$.

Analysis.—Calcd. for $C_{13}H_{27}N_3O$: $N_T$, 17.42; $N_B$, 11.61. Found: $N_T$, 17.35; $N_B$, 11.59.

(j) 4 - (3 - hydroxypropyl) - 1 - (2 - cyanoethyl)piperidine, in ethanol, was reduced under 790 pounds p.s.i. of hydrogen at a temperature of 25° C. over a 5 percent rhodium-on-alumina catalyst to give N - {3 - [4 - (3 - hydroxypropyl) - 1 - piperidyl]propyl}amine [III; $R_4$ is 4-$HOCH_2CH_2CH_2$, Y' is $(CH_2)_3$, m is 1], B.P. 89–104° C./0.004 mm. The latter was converted to the dihydrochloride salt to give N - {3 - [4 - (3 - hydroxypropyl) - 1-piperidyl]propyl}amine dihydrochloride, M.P. 163.8–165.2° C. (corr.) (recrystallized from isopropanol).

*Analysis.*—Calcd. for $C_{11}H_{24}N_2O.2HCl$: C, 48.35; H, 9.59; Cl, 25.95. Found: C, 48.52; H, 9.57; Cl, 25.46.

(*k*) 4-isopropyl-1-(2-cyanoethyl)piperidine, in ethanol, was reduced under 70 pounds p.s.i. of hydrogen at a temperature of about 60° C. over a 5 percent rhodium-on-alumina catalyst. The catalyst was removed by filtration, the filtrate taken to dryness and the residue distilled in vacuo giving a forerun of B.P. 35–45° C./0.05 mm. A second cut of B.P. 125–131° C./0.014 mm. was collected as N,N -bis - [3 - (4 - isopropyl - 1 - piperidyl)propyl]-amine [III; $R_4$ is 4-$(CH_3)_2CH$, Y' is $(CH_2)_3$, *m* is 2].

*Anlaysis.*—Calcd. for $C_{22}H_{45}N_3$: C, 75.15; H, 12.90; N, 11.95. Found: C, 75.18; H, 13.00; N, 12.16.

(*l*) The forerun from Example 8(*j*) of B.P. 35–45° C./0.05 mm. above was converted to the hydrochloride salt to give N - [3 - (4 - isopropyl - 1 - piperidyl)propyl]-amine dihydrochloride [III; $R_4$ is 4-$(CH_3)_2CH$, Y' is $(CH_2)_3$, *m* is 1], M.P. 163.8–165.2° C. (corr.) (recrystallized from isopropanol-acetone).

*Analysis.*—Calcd. for $C_{11}H_{24}N_2.2HCl$: C, 51.35; H, 10.19; N, 10.89. Found: C, 51.58; H, 10.21; N, 10.71.

(*m*) 4-benzyl-1-(2-cyanoethyl)piperidine, in ethanol, was reduced under 63 pounds p.s.i. of hydrogen at a temperature of about 60° C. over a 5 percent rhodium-on-alumina catalyst. The crude product was distilled in vacuo, and the fraction boiling at 88–97° C./0.05 mm. was collected as N - [3 - (4 - benzyl - 1- piperidyl)propyl]amine [III; $R_4$ is 4-$C_6H_5CH_2$, Y' is $(CH_2)_3$, *m* is 1].

*Analysis.*—Calcd. for $C_{15}H_{24}N_2$: N, 12.06. Found: N, 11.86.

(*n*) A second fraction from the distillation of the crude product obtained above in Example 8(*m*) was collected at 198–215° C./0.001 mm. which was taken into ether and treated with an excess of ethereal hydrochloric acid to give N,N-bis-[3-(4-benzyl-1-piperidyl)propyl]amine trihydrochloride [III; $R_4$ is 4-$C_6H_5CH_2$, Y' is $(CH_2)_3$, *m* is 2], M.P. 266.6–268.0° C. (corr.) (recrystallized from isopropanol).

*Analysis.*—Calcd. for $C_{30}H_{45}N_3.3HCl$: C, 64.68; H, 8.69; Cl, 19.10. Found: C, 64.57; H, 8.93; Cl, 18.96.

(*o*) 4-cyclohexylmethyl-1-(2-cyanoethyl)piperidine, in ethanol saturated with anhydrous ammonia, was reduced under 780 pounds p.s.i. of hydrogen at a temperature of 22° C. over a 5 percent rhodium-on-alumina catalyst. The crude product was distilled in vacuo giving material of B.P. 88–94° C./0.01–0.02 mm. which was taken into ether and treated with an excess of ethereal hydrochloric acid to give N-[3-(4-cyclohexylmethyl-1-piperidyl)propyl]amine dihydrochloride [III; $R_4$ is 4-$C_6H_{11}CH_2$, Y' is $(CH_2)_3$, *m* is 1], M.P. 280.2–282.4° C. (corr.).

*Analysis.*—Calcd. for $C_{15}H_{30}N_2.2HCl$: C, 57.87; H, 10.36; Cl, 22.78. Found: C, 57.78; H, 10.40; Cl, 22.59.

(*p*) 3-acetylamino-1-(2-cyanoethyl)piperidine, in ethanol saturated with anhydrous ammonia, was reduced under 824 pounds p.s.i. of hydrogen at a temperature of 27° C. over a 5 percent rhodium-on-alumina catalyst. The crude product was distilled in vacuo 0.05–0.06 mm. and the fraction boiling at 147–150° C./0.05–0.07 mm. was collected as N-[3-(3-acetylamino-1-piperidyl)propyl]amine [III; $R_4$ is 3-$CH_3CONH$, Y' is $(CH_2)_3$, *m* is 1].

*Analysis.*—Calcd. for $C_{10}H_{21}N_3O$: C, 60.26; H ,10.62; $N_B$, 14.06. Found: C, 60.38; H, 10.51; $N_B$, 14.19.

Similar to the procedure described above in Example 6, there can be obtained:

N - [3 - (4 - formyloxy - 1 - piperidyl)propyl]amine [III; $R_4$ is 4-HCOO, Y' is $(CH_2)_3$, *m* is 1] from 4-formyloxy-1-(2-cyanoethyl)piperidine, N - {3 - [4 - (3 - isobutyroxypropyl) - 1 - piperidyl]propyl}amine [III; $R_4$ is 4-$CH_2CH_2CH_2OCOC_3H_7$, Y' is $(CH_2)_3$, *m* is 1] from 4-(3-isobutyroxypropyl)-1-(2-cyanoethyl)piperidine, N - [3 - (4 - benzoyloxy - 1 - piperidyl)propyl]amine [III; $R_4$ is 4-$C_6H_5COO$, Y' is $(CH_2)_3$, *m* is 1] from 4-benzoyloxy-1-(2-cyanoethyl)piperidine, N - [2 - (3 - carbamyl - 1 - piperidyl)ethyl]amine [III; $R_4$ is 4-$CONH_2$, Y' is $(CH_2)_2$, *m* is 1] from 4-carbamyl-1-cyanomethylpiperidine, N - [4 - (4 - carbamyl - 1 - piperidyl)butyl]amine [III; $R_4$ is 4-$CONH_2$, Y' is $(CH_2)_4$, *m* is 1] from 4-carbamyl-1-(3-cyanopropyl)piperidine, N,N - bis - [3 - (3 - acetylamnio - 1 - piperidyl)propyl]-amine [III; $R_4$ is 3-$CH_3CONH$, Y' is $(CH_2)_3$, *m* is 2] from 3-acetylamino-1-(2-cyanoethyl)piperidine, N - [3 - (4 - cyclopropylmethyl - 1 - piperidyl)propyl]-amine [III; $R_4$ is 4-$C_3H_5CH_2$, Y' is $(CH_2)_3$, *m* is 1] from 4- cyclopropylmethyl - 1 - (2 - cyanoethyl)piperidine, and N - [6 - (4 - carbamyl - 1 - piperidyl)hexyl]amine [III; $R_4$ is 4-$CONH_2$, Y' is $(CH_2)_6$, *m* is 1] from 4-carbamyl-1-(5-cyanopentyl)piperidine.

PREPARATION OF FINAL PRODUCTS

Example 9

N - [3 - (4 - carbamyl-1-piperidyl)propyl]-N-[β-(3-indolyl)propionyl]amide [Ia; $R_1$, $R_2$, and $R_3$ are H, $R_4$ is 4-$CONH_2$, Y is $CH_2CH_2$, Y' is $CH_2CH_2CH_2$, *m* is 1]: To a solution of 5.68 g. (0.03 mole) of β-(3-indolyl) propionic acid and 3.54 g. (0.033 mole) of triethylamine in 200 ml. of acetone was added dropwise with stirring a solution of 3.26 g. (0.03 mole) of ethyl chloroformate in 125 ml. of acetone while maintaining the temperature at about −10° C. To the mixture was then added a mixture of 7.75 g. (0.03 mole) of N-[3-(4-carbamyl-1-piperidyl)propyl]amine dihydrochloride and 7.08 g. of triethylamine in 150 ml. of acetone. When addition was complete, the mixture was allowed to stand overnight, and the white solid which separated was filtered off and air-dried. The latter was recrystallized from ethanol giving 4.23 g. of N-[3-(4-carbamyl-1-piperidyl)propyl]-N-[β-(3-indolyl)propionyl]amide, M.P. 178.0–179.2° C. (corr.).

N - [3 - (4 - carbamyl-1-piperidyl)propyl]-N-[β-(3-indolyl)propionyl]amide reacts with formic acid, acetic acid, isobutyric acid, alpha-mercaptopropionic acid, malic acid, fumaric acid, succinic acid, succinamic acid, tartaric acid, citric acid, lactic acid, benzoic acid, 4-methoxybenzoic acid, phthalic acid, anthranilic acid, 1-naphthalenecarboxylic acid, cinnamic acid, cyclohexanecarboxylic acid, mandelic acid, tropic acid, crotonic acid, acetylene dicarboxylic acid, sorbic acid, 2-furancarboxylic acid, cholic acid, pyrenecarboxylic acid, 2-pyridinecarboxylic acid, 3-indoleacetic acid, quinic acid, sulfamic acid, methanesulfonic acid, isethionic acid, benzenesulfonic acid, p-toluenesulfonic acid, benzenesulfinic acid, butylarsonic acid, diethylphosphinic acid, p-aminophenylarsinic acid, phenylstibnic acid, phenylphosphinous acid, methylphosphonic acid, phenylphosphinic acid, Amberlite® XE-66 resin, hydrofluoric acid, hydrochloric acid, hydrobromic acid, hydriodic acid, perchloric acid, nitric acid, sulfuric acid, phosphoric acid, hydrocyanic acid, phosphotungstic acid, molybdic acid, phosphomolybdic acid, pyrophosphoric acid, arsenic acid, picric acid, picrolonic acid, barbituric acid, boron trifluoride, and the like, to give, respectively, the formate, acetate isobutyrate, alpha-mercaptopropionate, malate (or acid malate), fumarate (or acid fumarate), succinate (or acid succinate), succinamate, tartrate (or bitartrate), citrate (or acid citrate), lactate, benzoate, 4-methoxybenzoate, phthalate (or acid phthalate), anthranilate, 1-naphthalenecarboxylate, cinnamate, cyclohexanecarboxylate, mandelate, tropate, crotonate, cetylene dicarboxylate, sorbate (or acid sorbate), 2-furancarboxylate, cholate, pyrenecarboxylate, 2-pyridinecarboxylate, 3-indoleacetate, quinate, sulfamate, methanesulfonate, isethionate, benzenesulfonate, p-toluenesulfonate, benzenesulfinate, butylarsonate, diethylphosphinate, p-aminophenylarsinate, phenylstibnate phenylphosphinite, methylphosphonate, phenylphosphinate, Amberlite® XE–66 resin salt, hydrofluoride, hydrochloride, hydrobromide, hydriodide, perchlorate, nitrate, sulfate (or bisulfate), phosphate (or acid phosphate), hydrocyanide, phosphotungstate, molybdate, phosphomolybdate, pyrophosphate, arsenate, picrate, picrolonate, barbiturate and boron trifluoride salts.

N - [3 - (4 - carbamyl - 1 - piperidyl)propyl] - N - [β-(3-indolyl)-propionyl]amide can be reacted with hydriodic acid to form N-[3-(4-carbamyl-1-piperidyl)propyl]-N-[β-(3-indolyl)propionyl]-amide hydriodide, useful as a characterizing intermediate.

N - [3 - (4 - carbamyl - 1 - piperidyl)propyl] - N - [β-(3-indolyl)-propionyl]amide, in the form of its hydriodide salt, can be converted to the hydrochloride salt by passing an aqueous solution of the former over an ion-exchange resin saturated with chloride ions, for example, Rohms & Haas' Amberlite® IRA–400 resin.

N - [3 - (4 - carbamyl - 1 - piperidyl)propyl] - N - [β-(3-indolyl)-propionyl]amide can be reacted with methyl iodide, methyl bromide, ethyl bromide, allyl bromide, benzyl chloride, 2-chlorobenzyl chloride, or methyl p-toluenesulfonate to give the methiodide, methobromide, ethobromide, allobromide, benzochloride, 2-chlorobenzochloride, or metho-p-toluenesulfonate salts, respectively.

The compounds of the following examples were prepared according to the procedure described above in Example 9.

Example 10

(a) β-(1-indolyl)propionic acid was reacted with ethyl chloroformate in acetone in the presence of triethylamine and the resulting mixed anhydride reacted with N-[3-(4-carbamyl-1-piperidyl)propyl]amine in acetone to give N-[3-(4-carbamyl-1-piperidyl)propyl] - N-[β-(1-indolyl)propionyl]amide [Ic; $R_1$ and $R_3$ are H, $R_4$ is 4-$CONH_2$, Y is $CH_2CH_2$, Y' is $(CH_2)_3$, m is 1], M.P. 150.4–151.8° C. (corr.) (recrystallized from isopropanol).

(b) β-(3-indolyl)propionic acid was reacted with isobutyl chloroformate in acetone in the presence of triethylamine and the resulting mixed anhydride reacted with N-{3-[4-(N-methylcarbamyl) - 1-piperidyl]propyl}amine to give N-{3-[4-(N-methylcarbamyl)-1-piperidyl]propyl}-N-[β-(3-indolyl)propionyl]amide [Ia; $R_1$, $R_2$ and $R_3$ are H, $R_4$ is 4-$CONHCH_3$, Y is $CH_2CH_2$, Y' is $(CH_2)_3$, m is 1], M.P. 194.4–195.6° C. (corr.) (recrystallized from an isopropanol-ethyl acetate mixture).

(c) β-(3-indolyl)propionic acid was reacted with ethyl chloroformate in acetone in the presence of triethylamine and the resulting mixed anhydride reacted with N,N-bis {3-[4-(N-methylcarbamyl)-1 - piperidyl]propyl}amine to give N,N-bis-{3-[4-(N-methylcarbamyl)-1-piperidyl]propyl}-N-[β-(3-indolyl)propionyl]-amide [Ia; $R_1$, $R_2$ and $R_3$ are H, $R_4$ is 4-$CONHCH_3$, Y is $CH_2CH_2$, Y' is $(CH_2)_3$, m is 2], M.P. 139.2–140.6° C. (corr.) (recrystallized from ethanol).

(d) β-(1-indolyl)propionic acid was reacted with isobutyl chloroformate in acetone in the presence of triethylamine and the resulting mixed anhydride reacted with N,N-bis-{3-[4-(N-methylcarbamyl) - 1-piperidyl]propyl} amine to give N,N-bis-{3-[4-(N-methylcarbamyl)-1-piperidyl]propyl}-N-[β-(1-indolyl)propionyl]amide [Ic; $R_1$ and $R_3$ are H, $R_4$ is 4-$CONHCH_3$, Y is $CH_2CH_2$, Y' is $(CH_2)_3$, m is 2], M.P. 117.2–119.0° C. (corr.) (recrystallized from ethyl acetate).

(e) β-(3-indolyl)propionic acid was reacted with ethyl chloroformate in acetone in the presence of triethylamine and the resulting mixed anhydride reacted with N-{3-[4-(N-ethylcarbamyl)-1-piperidyl]propyl}amine to give N-{3-[4-N-ethylcarbamyl) - 1 - piperidyl]propyl}-N-[β-(3-indolyl)propionyl]amide [Ia; $R_1$, $R_2$ and $R_3$ are H, $R_4$ is 4-$CONHC_2H_5$, Y is $CH_2CH_2$, Y' is $(CH_2)_3$, m is 1], M.P. 212.8–213.6° C. (corr.) (recrystallized from ethanol).

(f) β-(1-indolyl)propionic acid was reacted with ethyl chloroformate in acetone in the presence of triethylamine and the resulting mixed anhydride reacted with N-{3-[4-(N-ethylcarbamyl)-1-piperidyl]propyl}amine to give N-{3-[4-(N-ethylcarbamyl) - 1 - piperidyl]propyl}-N-[β-(3-indolyl)propionyl]amide [Ic; $R_1$ and $R_3$ are H, $R_4$ is 4-$COHNC_2H_5$, Y is $CH_2CH_2$, Y' is $(CH_2)_3$, m is 1], M.P. 152.0–152.6° C. (corr.) (recrystallized from ethyl acetate).

(g) β-(3-indolyl)propionic acid was reacted with ethyl chloroformate in acetone in the presence of triethylamine and the resulting mixed anhydride reacted with N,N-bis-{3-[4-(N - ethylcarbamyl) - 1 - piperidyl]propyl}amine to give N,N - bis-{3-[4-(N-ethylcarbamyl)-1-piperidyl]propyl}-N-[β-(3-indolyl)propionyl]amide [Ia; $R_1$, $R_2$ and $R_3$ are H, $R_4$ is 4-$CONHC_2H_5$, Y is $CH_2CH_2$, Y' is $(CH_2)_3$, m is 2], M.P. 185.6–186.4° C. (corr.) (recrystallized from ethanol).

(h) β-(3-indolyl)propionic acid was reacted with isobutyl chloroformate in acetone in the presence of triethylamine and the resulting mixed anhydride reacted with N-[3-(4-isopropyl-1-piperidyl)propyl]amine to give N-[3-(4-isopropyl - 1 - piperidyl)propyl] - N-[β-(3-indolyl)propionyl]amide [Ia; $R_1$, $R_2$, and $R_3$ are H, $R_4$ is 4-$CH(CH_3)_2$, Y is $CH_2CH_2$, Y' is $(CH_2)_3$, m is 1], M.P. 168.6–170.8° C. (corr.) (recrystallized from ethyl acetate).

(i) β-(3-indolyl)propionic acid was reacted with isobutyl chloroformate in acetone in the presence of triethylamine and the resulting mixed anhydride reacted with N-[3-(4-cyclohexylmethyl-1-piperidyl)propyl]amine to give N-[3-(4-cyclohexylmethyl-1-piperidyl)propyl]-N-[β-(3-indolyl)propionyl]amide [Ia; $R_1$, $R_2$, and $R_3$ are H, $R_4$ is $C_6H_{11}CH_2$, Y is $CH_2CH_2$, Y' is $(CH_2)_3$, m is 1], M.P. 141.8–143.8° C. (corr.) (recrystallized from ethyl acetate).

(j) β-(1-indolyl)propionic acid was reacted with isobutyl chloroformate in acetone in the presence of triethylamine and the resulting mixed anhydride reacted with N-[3-(4-cyclohexylmethyl-1-piperidyl)propyl]amine to give N-[3-(4-cyclohexylmethyl-1-piperidyl)propyl]-N-[β-(1-indolyl)propionyl]amide [Ic; $R_1$ and $R_3$ are H, $R_4$ is 4-$C_6H_{11}CH_2$, Y is $CH_2CH_2$, Y' is $(CH_2)_3$, m is 1], M.P. 92.6–93.6° C. (corr.) (recrystallized from hexane).

(k) β-(3-indolyl)propionic acid was reacted with isobutyl chloroformate in acetone in the presence of triethylamine and the resulting mixed anhydride reacted with N-[3-(4-benzyl-1-piperidyl)propyl]amine to give N-[3-(4-benzyl - 1 - piperidyl)propyl] - N-[β-(3-indolyl) propionyl]amide [Ia; $R_1$, $R_2$, and $R_3$ are H, $R_4$ is 4-$C_6H_5CH_2$, Y is $CH_2CH_2$, Y' is $(CH_2)_3$, m is 1], M.P. 159.2–160.2° C. (corr.) (recrystallized from ethyl acetate).

(l) β-(1-indolyl)propionic acid was reacted with isobutyl chloroformate in acetone in the presence of triethylamine and the resulting mixed anhydride reacted with N-[3-(4-benzyl-1-piperidyl)propyl]amine to give N-[3-(4-benzyl - 1 - piperidyl)propyl]-N-[3-(1-indolyl)propionyl]amide [Ic; $R_1$ and $R_3$ are H, $R_4$ is $C_6H_5CH_2$, Y is $CH_2CH_2$, Y' is $(CH_2)_3$, m is 1], M.P. 70.8–72.2° C. (corr.) (recrystallized from hexane).

(m) β-(3-indolyl)propionic acid was reacted with isobutyl chloroformate in acetone in the presence of triethylamine and the resulting mixed anhydride reacted with N-[3-(3-acetylamino-1-piperidyl)-propyl]amine to give N-[3-(3-acetylamino-1-piperidyl) - propyl] - N - [β-(3-indolyl)propionyl]amide [Ia; $R_1$, $R_2$, and $R_3$ are H, $R_4$ is 3-$CH_3CONH$, Y is $CH_2CH_2$, Y' is $(CH_2)_3$, m is 1], M.P. 139.4–140.6° C. (corr.) (recrystallized from ethyl acetate-hexane).

Examples 11 (a–r)

By following the manipulative procedure described above in Example 9, substituting for the N-[3-(4-carbamyl-1-piperidyl)-propyl]amine and the β-(3-indolyl)-propionic acid used therein molar equivalent amounts of an appropriate N-mono-[(substituted-1-piperidyl)lower-alkyl]amine or N,N-bis-[(substituted-1-piperidyl)lower-alkyl]amine and a substituted-(2- or 1-indolyl)- lower-alkanoic acid, there can be obtained the compounds of Formulas Ib, or Ic listed below in Table A.

Example 13

N,N - bis - {3 - [4 - (N - ethylcarbamyl) - 1 - piperidyl]-propyl}-N-[2-(3-indolyl)ethyl]amine [IIa; $R_1$, $R_2$ and $R_3$

TABLE A

| Example | Formula | $R_1/R_2$ | $R_3/R_4$ | Y/Y' | m/n |
|---|---|---|---|---|---|
| 11(a) | Ib | 6-CH$_3$O | H | CH$_2$ | 1 |
|  |  | H | 4-HO | (CH$_2$)$_3$ | 1 |
| 11(b) | Ib | 5,6-di-CH$_3$O | H | CH$_2$CH$_2$ | 2 |
|  |  | H | 4-HO | (CH$_2$)$_3$ | 2 |
| 11(c) | Ib | 6-CH$_3$S | H | (CH$_2$)$_3$ | 2 |
|  |  | H | 4-CH$_2$CH$_2$CH$_2$OH | (CH$_2$)$_3$ | 1 |
| 11(d) | Ib | 6-CH$_3$SO$_2$ | H | (CH$_2$)$_4$ | 1 |
|  |  | H | 4-HCOO | (CH$_2$)$_3$ | 1 |
| 11(e) | Ib | 6-HO | H | (CH$_2$)$_5$ | 1 |
|  |  | H | 4-(CH$_2$)$_3$OCOC$_3$H$_7$ | (CH$_2$)$_3$ | 1 |
| 11(f) | Ib | 5,6-OCH$_2$O | H | CH$_2$CH$_2$ | 1 |
|  |  | H | 4-C$_6$H$_5$COO | (CH$_2$)$_3$ | 1 |
| 11(g) | Ib | 6-C$_6$H$_5$CH$_2$O | H | CH$_2$CH$_2$ | 1 |
|  |  | CH$_3$ | 4-CH(CH$_3$)$_2$ | (CH$_2$)$_3$ | 1 |
| 11(h) | Ib | 5-Cl | H | CH$_2$CH$_2$ | 2 |
|  |  | C$_6$H$_5$CH$_2$ | 4-C$_6$H$_5$CH$_2$ | (CH$_2$)$_3$ | 1 |
| 11(i) | Ib | H | H | CH$_2$CH$_2$ | 2 |
|  |  | C$_6$H$_5$CH$_2$CH$_2$ | 4-CH$_3$CONH | (CH$_2$)$_3$ |  |
| 11(j) | Ic | H | CH$_3$ | CH$_2$CH$_2$ | 1 |
|  |  | H | 4-CONH$_2$ | CH$_2$CH$_2$ |  |
| 11(k) | Ic | H | C$_6$H$_5$ | (CH$_2$)$_4$ | 1 |
|  |  | H | 4-CONH$_2$ | (CH$_2$)$_4$ |  |
| 11(l) | Ic | H | 4-CH$_3$OC$_6$H$_4$ | (CH$_2$)$_5$ | 2 |
|  |  | H | 4-CONH$_2$ | (CH$_2$)$_3$ |  |
| 11(m) | Ic | H | H | CH$_2$CH$_2$ | 1 |
|  |  | H | 4-CONH$_2$ | (CH$_2$)$_3$ |  |
| 11(n) | Ic | H | H | CH$_2$CH$_2$ | 1 |
|  |  | H | 4-CON(C$_2$H$_5$)$_2$ | (CH$_2$)$_3$ |  |
| 11(o) | Ic | H | H | CH$_2$CH$_2$ | 2 |
|  |  | H | 4-CON(CH$_3$)$_2$ | (CH$_2$)$_3$ |  |
| 11(p) | Ic | H | H | (CH$_2$)$_2$ | 1 |
|  |  | H | 4-C$_6$H$_{11}$CH$_2$ | (CH$_2$)$_3$ |  |
| 11(q) | Ic | H | H | (CH$_2$)$_2$ | 1 |
|  |  | H | 4-C$_3$H$_5$CH$_2$ | (CH$_2$)$_3$ |  |
| 11(r) | Ic | H | H | (CH$_2$)$_2$ | 1 |
|  |  | H | 4-CONH$_2$ | (CH$_2$)$_6$ |  |

Example 12

N,N - bis - {3 - [4 - (N - ethylcarbamyl) - 1-piperidyl]-propyl}-N-[3-(1-indolyl)propyl]amine [IIc; $R_1$ and $R_3$ are H, $R_4$ is 4-CONHC$_2$H$_5$, Y' and Y" are (CH$_2$)$_3$, m is 2]: A mixture of 3.88 g. (0.02 mole) of 3-(1-indolyl)-propyl chloride, 9.02 g. (0.02 mole) of N,N-bis-{3-[4-(N-ethylcarbamyl)-1-piperidyl]propyl}amine, and 3.3 g. (0.04 mole) of sodium bicarbonate and 275 ml. of acetonitrile was heated under reflux for forty-eight hours, allowed to cool and the mixture filtered to remove the solid which had separated. The filtrate was evaporated to dryness in vacuo and the residual oil taken into ethyl acetate, washed with cold water and then extracted with dilute aqueous methanesulfonic acid. The acid extracts were filtered, basified with concentrated ammonium hydroxide and semi-saturated with solid potassium carbonate. The oil which separated solidified on standing for several days and was collected and recrystallized from an ethyl acetatehexane mixture giving 3.26 g. of N,N-bis - {3 - [4 - (N - ethylcarbamyl) - 1 - piperidyl]propyl}-N - [3 - (1 - indolyl)propyl]amine, M.P. 91.6–93.2° C. (corr.).

are H, $R_4$ is 4-CONCH$_2$H$_5$, Y' is (CH$_2$)$_3$, Y" is CH$_2$CH$_2$, m is 2] was prepared according to the procedure described above in Example 12. 2-(3-indolyl)ethyl bromide was reacted with a molar excess of N,N-bis-{3-[4-(N-ethylcarbamyl)-1-piperidyl]propyl}amine in acetonitrile to give N,N-bis-{3-[4-(N-ethylcarbamyl)-1,1piperidyl]propyl}-N-[2-(3-indolyl)ethyl]amine, M.P. 150.4–152.8° C. (corr.) (recrystallized from isopropanol).

Examples 14 (a–q)

By following the manipulative procedure described above in Example 12, substituting for the 3-(1-indolyl) propyl chloride and the N,N-bis-{3-[4-(N-ethylcarbamyl)-1-piperidyl]propyl}amine used therein molar equivalent amounts of an appropriate N-mono-[(substituted-1-piperidyl)lower-alkyl]amine or N,N-bis-[(substituted-1-piperidyl)lower-alkyl]amine and an appropriate substituted-(3-, 2-, or 1-indolyl)lower-alkyl halide, there can be obtained the copounds of Formulas IIa, b, and c listed below in Table B.

TABLE B

| Example | Formula | $R^1/R_2$ | $R_3/R_4$ | Y'/Y" | m/n |
|---|---|---|---|---|---|
| 14(a) | IIa | 6-CH$_3$O | H | (CH$_2$)$_3$ | 1 |
|  |  | H | 4-OH | CH$_2$CH$_2$ | 1 |
| 14(b) | IIa | 3,6-di-CH$_3$O | H | (CH$_2$)$_3$ | 2 |
|  |  | H | 4-OH | (CH$_2$)$_3$ | 2 |
| 14(c) | IIa | 6-CH$_3$S | H | (CH$_2$)$_3$ | 2 |
|  |  | H | 4-CH CH CH$_2$OH | CH$_2$CH$_2$ | 1 |
| 14(d) | IIa | 6-CH$_3$SO$_2$ | H | (CH$_2$)$_3$ | 1 |
|  |  | H | 4-HCOO | (CH$_2$)$_5$ | 1 |
| 14(e) | IIa | 6-HO | H | (CH$_2$)$_3$ | 1 |
|  |  | H | 4-(CH$_2$)$_3$OCOC$_3$H$_7$ | (CH$_2$)$_7$ | 1 |
| 14(f) | IIa | 5,6-OCH$_2$O | H | (CH$_2$)$_3$ | 1 |
|  |  | H | 4-C$_6$H$_5$COO | CH$_2$CH$_2$ | 1 |
| 14(g) | IIa | 6-C$_6$H$_5$CH$_2$O | H | CH$_2$CH$_2$ | 1 |
|  |  | H | 4-CONH$_2$ | (CH$_2$)$_4$ | 1 |
| 14(h) | IIa | 5-Cl | H | (CH$_2$)$_4$ | 1 |
|  |  | H | 4-CONH$_2$ | (CH$_2$)$_3$ | 2 |
| 14(i) | IIb | H | H | CH$_2$CH$_2$ |  |
|  |  | CH$_3$ | 4-CONHCH$_3$ | CH$_2$CH$_2$ |  |
| 14(j) | IIb | H | H | (CH$_2$)$_3$ | 1 |
|  |  | C$_6$H$_5$CH$_2$ | 4-CON(CH$_3$)$_2$ | (CH$_2$)$_4$ |  |
| 14(k) | IIb | H | H | (CH$_2$)$_3$ | 2 |
|  |  | C$_6$H$_5$CH$_2$CH$_2$ | 4-CON(CH$_3$)$_2$ | (CH$_2$)$_6$ |  |

TABLE B—Continued

| Example | Formula | R₁/R₂ | R₃/R₄ | Y'/Y" | m/n |
|---|---|---|---|---|---|
| 14(l) | IIc | H | CH₃ | (CH₂)₃ | 1 |
| | | H | 4-CH(CH₃)₂ | CH₂CH₂ | |
| 14(m) | IIc | H | C₆H₅ | (CH₂)₃ | 2 |
| | | H | 4-C₆H₅CH₂ | CH₂CH₂ | |
| 14(n) | IIc | H | 4-CH₃OC₆H₄ | (CH₂)₃ | 2 |
| | | H | 4-CH₃CONH | (CH₂)₄ | |
| 14(o) | IIc | H | H | (CH₂)₃ | 1 |
| | | H | 4-C₆H₁₁CH₂ | (CH₂)₇ | |
| 14(p) | IIc | H | H | (CH₂)₃ | 1 |
| | | H | 4-C₃H₅CH₂ | (CH₂)₃ | |
| 14(q) | IIc | H | H | (CH₂)₆ | 1 |
| | | H | 4-CONH₂ | (CH₂)₃ | |

The compounds of Formulas Ia, b, c and IIa, b, c have been shown to have hypotensive activity in rats. Hypotensive activity was determined by subcutaneous administration in renal hypertensive rats using the photoelectric tensometer foot method described by Kersten et al., J. Lab. Clin. Med. 32, 1090 (1957). The activities of the compounds were expressed in terms of the Minimum Effective Hypotensive Dose (MEHD) which is defined as the smallest dose which produced at least one significant fall below the control blood pressure reading, where a significant fall is interpreted as being below the limit of two standard errors. The activities thus obtained for some of the compounds of the invention are as follows:

N-{3-[4-(N-ethylcarbamyl)-1-piperidyl]propyl}-N-
[β-(3-indolyl)-propionyl]amide [Formula Ia, Example 10(e)], MEHD=1.0 mg./kg.

N-{3-[4-(N-ethylcarbamyl)-1-piperidyl]propyl}-N-
[β-(1-indolyl)-propionyl]amide [Formula Ic, Example 10(f)], MEHD=1.0 mg./kg.

N,N-bis{3-[4-(N-ethylcarbamyl)-1-piperidyl]propyl}-
N-[2-(3-indolyl)ethyl]amine [Formula IIa, Example 13], AED₅₀ (Average Effective Dose)=10.0 mg./kg.

The compounds of Formulas Ia, b, and c have been found to possess monoamine oxidase inhibitory activity. This activity was determined in mice using the photocell activity cage method described by Dews, Brit. J. Pharmacol., 8, 46 (1953). The mice were pretreated with the compound prior to treatment with 5-hydroxytryptophane or (levo)-3,4-dihydroxyphenylalanine and the stimulatory effect measured by the number of times the animal broke the photocell beam during a period of thirty minutes. The dose necessary to produce psychomotor stimulation was noted and the activities expressed relative to the activity of iproniazid. Thus N-[3-(4-carbamyl - 1 - piperidyl)propyl] - N - [β - (3 - indolyl)-propionyl]amide [Formula Ia, Example 9] was found to have about one tenth the monoamine oxidase inhibitory activity of iproniazid.

The compounds of Formulas Ia, b, and c have been found to possess coronary dilator activity as determined by studies in pituitrin constructed isolated rabbit heart using a Langendorph perfusion apparatus and the activities expressed in terms of percent dilation. Thus N-[3-(4 - carbamyl - 1 - piperidyl)propyl] - N - [β - (3 - indolyl)propionyl]amide [Formula Ia, Example 9] produced 8.1% coronary dilation.

The compounds of Formulas IIa, b, and c have been shown to possess mild analgesic activity. Mild analgesic activity was determined using the test procedure described by Randall et al., Arch. intern. pharmacodynamie 111, 409 (1957) which involves eliciting a pain reaction by the application of steadily increasing pressure to the foot of a rat inflamed by prior injection of brewer's yeast into the plantar surface. The pain threshold was measured in terms of the pressure in mm. Hg required to elicit the pain response, and the activities expressed relative to the activity of aspirin. Thus N,N-bis-{3-[4 - (N - ethylcarbamyl) - 1 - piperidyl] - propyl} - N-[2-(3-indolyl)ethyl]amine [Formula IIa, Example 13] was found to have about 50% of the mild analgesic activity of aspirin.

We claim:

1. A member of the group consisting of (A) compounds of the formula

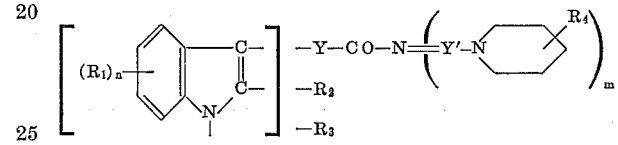

wherein any one of the three free valences at the 1-, 2- and 3-positions of the indole nucleus is taken up by the

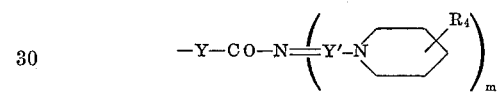

group and the valences at the 1- and 2-positions, when not taken up by the said group, are taken up by the groups R₂ and R₃, respectively; and wherein R₁ is a member of the group consisting of hydrogen, hydroxy, lower-alkoxy, monocarbocyclic aryl-lower-alkoxy, methylenedioxy, lower-alkylmercapto, lower-alkylsulfonyl, and halogen; R₂ is a member of the group consisting of hydrogen, lower-alkyl, and monocarbocyclic aryl-lower-alkyl; R₃ is a member of the group consisting of hydrogen, lower-alkyl, and monocarbocyclic aryl; R₄ is a member of the group consisting of hydroxy, hydroxy-lower-alkyl, lower-alkanoyloxy, monocarbocyclic aroyloxy, lower-alkanoyloxy-lower - alkyl, monocarbocyclic aroyloxy-lower-alkyl, unsubstituted-carbamyl, N-lower-alkylcarbamyl, N,N-di-lower-alkylcarbamyl, N - lower-alkenylcarbamyl, N,N-di-lower-alkenylcarbamyl, lower - alkanoylamino, lower-alkyl, monocarbocyclic arylmethyl, and cycloalkyl-lower-alkyl; Y is lower-alkylene having from one to six carbon atoms; Y' is lower-alkylene having from two to six carbon atoms; and n and m each is an integer from one to two; (B) acid-addition salts thereof; and (C) quaternary ammonium salts thereof.

2. An acid-addition salt of a compound of the formula

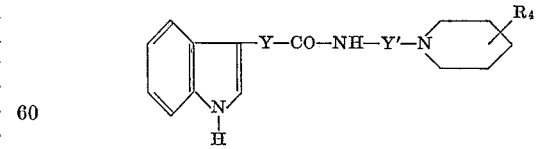

wherein R₄ is unsubstituted-carbamyl, Y is lower-alkylene having from one to six carbon atoms, and Y' is lower-alkylene having from two to six carbon atoms.

3. An acid-addition salt of a compound of the formula

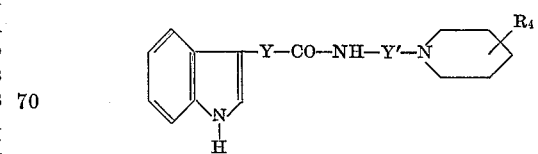

wherein R₄ is N-lower-alkylcarbamyl, Y is lower-alkylene having from one to six carbon atoms, and Y' is lower-alkylene having from two to six carbon atoms.

4. An acid-addition salt of a compound of the formula

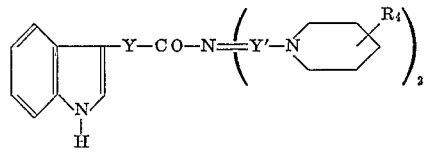

wherein $R_4$ is N-lower-alkylcarbamyl, Y is lower-alkylene having from one to six carbon atoms, and Y' is lower-alkylene having from two to six carbon atoms.

5. An acid-addition salt of a compound of the formula

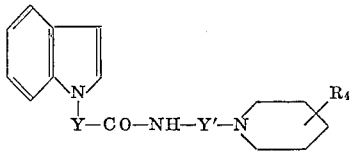

where $R_4$ is unsubstituted-carbamyl, Y is lower-alkylene having from one to six carbon atoms, and Y' is lower-alkylene having from two to six carbon atoms.

6. An acid-addition salt of a compound of the formula

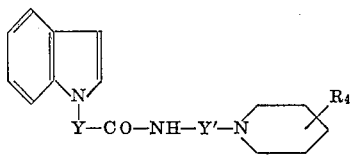

wherein $R_4$ is N-lower-alkylcarbamyl, Y is lower-alkylene having from one to six carbon atoms, and Y' is lower-alkylene having from two to six carbon atoms.

7. An acid-addition salt of a compound of the formula

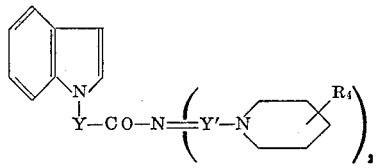

wherein $R_4$ is N-lower-alkylcarbamyl, Y is lower-alkylene having from one to six carbon atoms, and Y' is lower-alkylene having from two to six carbon atoms.

8. An acid-addition salt of N-[3-(4-carbamyl-1-piperidyl)-propyl]-N-[β-(3-indolyl)propionyl]amide.

9. An acid-addition salt of N-{3-[4-(N-methylcarbamyl))-1-piperidyl]propyl} - N - [β-(3-indolyl)propionyl] amide.

10. An acid-addition salt of N-{3-[4-(N-ethylcarbamyl) - 1 - piperidyl]propyl}-N-[β-(3-indolyl)propionyl] amide.

11. An acid-addition salt of N,N-bis-{3-[4-(N-methylcarbamyl) - 1 - piperidyl]propyl}-N-[β-(3-indolyl)propionyl]amide.

12. An acid-addition salt of N,N-bis-{3-[4-(N-ethylcarbamyl) - 1 - piperidyl]propyl}-N-[β-(3-indolyl)propionyl]amide.

13. An acid-addition salt of N-[3-(4-carbamyl-1-piperidyl)-N-[β-(1-indolyl)propionyl]amide.

14. An acid-addition salt of N-{3-[4-(N-ethylcarbamyl) - 1 - piperidyl]propyl}-N-[β-(1-indolyl)propionyl] amide.

15. An acid-addition salt of N,N-bis-{3-[4-(N-methylcarbamyl) - 1 - piperidyl]propyl}-N-[β-(1-indolyl)propionyl]amide.

References Cited by the Examiner

James R. Vaughan, Jr.: "J. Am. Chem. Society," vol. 73, page 3547 (1957).

NICHOLAS S. RIZZO, *Primary Examiner.*

UNITED STATES PATENT OFFICE
CERTIFICATE OF CORRECTION

Patent No. 3,211,736                      October 12, 1965

Bernard L. Zenitz et al.

It is hereby certified that error appears in the above numbered patent requiring correction and that the said Letters Patent should read as corrected below.

Column 1, line 12, for "-alkyl]-3-," read -- -alkyl]-N-[(3-, --; same column 1, lines 45 to 50, for that portion of the formula reading "-Y'-N=" read -- -Y"-N= --; column 7, line 4, strike out "the"; column 8, line 43, for "phamaraceutically-acceptable" read -- pharmaceutically-acceptable --; lines 48 and 49, for "pharamaceutical" read -- pharmaceutical --; lines 55 and 56, for "pharamaceutically-acceptable" read -- pharmaceutically-acceptable --; column 9, line 7, after "X" insert a comma; column 10, line 74, after "4-$COOCH_3$" insert a comma; column 11, line 23, for "mixture." read -- mixture). --; line 52, for "cyanoethyl)-piperidine" read -- cyanoethyl)piperidine --; line 64, for "110.6-111.8° C." read -- 116.4-117.2° C. --; column 12, line 2, before "recrystallized" insert an opening parenthesis; line 8, for "151.159°" read -- 151-159° --; line 33, for "4-(3-isobutyroxypropyl)-piperidine" read -- 4-(3-isobutyroxypropyl)piperidine --; line 39, for "4-$C_3H_5CH_3$" read -- 4-$C_3H_5CH_2$ --; same column 12, lines 43 and 44, for "4-$COHN_2$" read -- 4-$CONH_2$ --; column 14, line 24, for "-piperidyl]-propyl}amine" read -- -piperidyl]propyl}amine --; line 56, before "4-" insert -- (i) --; column 15, line 60, after "vacuo" insert -- at --; column 16, line 4, for "N-[2-(3-" read -- N-[2-(4- --; line 63, after "acetate" insert a comma; line 70, for "cetylene" read -- acetylene --; same column 16, line 75, after "phenylstibnate" insert a comma; column 17, line 10, for "propionyl]-amide" read -- propionyl]amide --; lines 13 and 19, for "(3-indolyl)-propionyl]amide", each occurrence, read -- (3-indolyl)propionyl]amide --; line 16, for "Rohms" read -- Rohm --; line 52, for "propionyl]-amide" read -- propionyl]amide --; same column 17, line 69, for "{3-[4-N-" read -- {3-[4-(N- --; column 18, line 2, for "-[β-(3-" read -- -[β-(1- --; line 4, for "4-$COHNC_2H_5$" read -- 4-$CONHC_2H_5$ --; same column 18, lines 62, 63 and 72, for "-1-piperidyl)-propyl", each occurrence, read -- -1-piperidyl)propyl --; column 20, 3,211,736 line 34, for "4-CONCH$_2$H$_5$" read -- 4-CONHC$_2$H$_5$ --; lines 40 and 41, for "-1,1piperidyl" read -- -1-piperidyl --; same column 20, TABLE B, third column, line 3 thereof, for "3,6-di-CH$_3$O" read -- 5,6-di-CH$_3$O --; same table, fourth column, line 6, for "4-CH CH CH$_2$OH" read -- 4-CH$_2$CH$_2$CH$_2$OH --; column 21, lines 30 and 33, for "-indolyl)-propionyl", each occurrence, read -- -indolyl)propionyl --; column 24, lines 26 and 27, for "-piperidyl)-propyl" read -- -piperidyl)propyl --.

Signed and sealed this 13th day of December 1966.

(SEAL)
Attest:

ERNEST W. SWIDER
Attesting Officer

EDWARD J. BRENNER
Commissioner of Patents